United States Patent Office 3,426,823
Patented Feb. 11, 1969

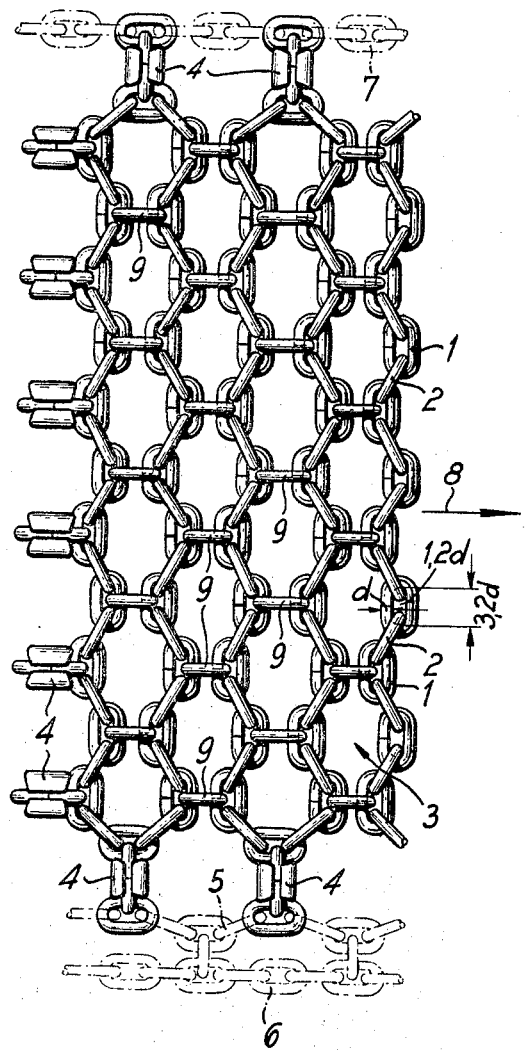

3,426,823
PROTECTIVE TIRE CHAINS
Werner Helmut Rieger, Haus Haeselbach, Unterkochen, Wurttemberg, Germany
Filed June 2, 1966, Ser. No. 554,733
Claims priority, application Germany, June 11, 1965, R 40,847
U.S. Cl. 152—231     5 Claims
Int. Cl. B60c 27/06

ABSTRACT OF THE DISCLOSURE

A protective tire chain consisting of a network of contiguous hexagons including oval chain links wherein the links at the sides of the hexagons are in a plane at right angles to the tire surface, and the links at the corners thereof are in a plane parallel to the tire surface, the long axis of the corner links are all positioned transversely to the direction of travel of the vehicle.

---

This invention relates to protective tire chains whose network consists of contiguous hexagons and wherein each side of each hexagon consists of an element positioned in a plane at right angles to the tire surface, and each corner is formed by an element positioned in a plane parallel to the tire surface.

In previously known chains of this kind the links which are positioned in planes parallel to the tire surface are rings. These rings have the disadvantage particularly when applied to large bucket-wheel-scrapers, that in the course of time they become squashed together in the direction of travel of the vehicle.

This invention eliminates this disadvantage and provides that the elements which are positioned parallel to the tire surface are oval chain links with their long axes running transversely to the direction of travel of the vehicle. Just how the elements which are positioned at right angles to the tire surface are arranged is immaterial.

The oval links which are positioned transversely to the direction of travel of the vehicle can be regarded as developed from rings by squashing them together during manufacture. These oval members therefore already have the shape which the rings of the previously known tire chains tend to assume during operation of the vehicle. When the vehicle is travelling the chain links enter the region of contact between the tire and the ground somewhat twisted out of position or disarranged and are thus subjected to extremely high bending stresses. In this regard the oval chain links are much more stable and therefore more durable than rings.

An advantageous further development of the invention consists in that the greatest internal diameter (division or pitch) of the oval chain link is somewhat greater than three times the thickness of the element which is positioned at right angles to the tire tread surface. In particular this dimension is according to the invention $t = 3 \cdot 2d$, where $t$ is the chain pitch (greatest internal diameter of the link) and $d$ is the thickness of the arm of the link. Thus the greatest internal diameter of the oval chain link is such that three elements positioned at right angles to the tire tread surface are just easily accommodated in the link but fill out the space available almost entirely, providing a support for the oval chain link.

It is particularly advantageous to make the elements which are positioned at right angles to the tire tread surface almost in the form of oval chain links. If this is done then the entire chain network consists of members of all the same kind. The great advantage of a chain mesh constructed in this way is that it is very simple to manufacture, as will be seen from the description which will now follow of the version shown in the single figure in the drawing.

Referring now to the drawing the chain consists of oval links 1 and 2, which are linked together to form hexagons 3. The links 1, which are positioned parallel to the tire surface form the corner points of the hexagon, and the links 2 form the sides of the hexagon 3. The chain joints 4 connect together the individual chain elements constituting the chain, and at the same time connect these elements to the side chains 5, 6 and 7 which run along the inner and outside walls of the tire. The greatest internal diameter $t$ of the link 1, 2 is $3 \cdot 2d$ where $d$ is the thickness of the link. The least internal diameter of the link 1, 2 is $1 \cdot 2d$. The direction of travel of the vehicle is shown by the arrow 8.

The links 1 are positioned parallel to the tire surface, and each link 1 is positioned with its longest dimension transverse to the direction of travel of the vehicle. These links 1 can be regarded as developed from rings by squashing the ring together in the direction of travel of the vehicle. When the vehicle is travelling, considerable deformation forces are applied to these links which are positioned parallel to the surface of the tire tread, particularly in the case of large bucket loaders and scrapers, in that the part of the chain just in front of the area of contact between the tire and the ground is loose and when the load is imposed on the chain, heavy deformation stresses are applied. Under these circumstances the oval links arranged according to the invention are considerably more stable than rings.

The tire chain represented in the drawing also provides a further advantage in that it is very simple to manufacture. It consists substantially of links of ordinary chain running transversely to the direction of travel of the vehicle, said links of chain joined together by connecting links 9, each of which connects together two of the links 1 which are positioned parallel to the surface of the tire tread. To manufacture this chain network it is merely necessary to begin by manufacturing the links of ordinary chain, a process which can be performed fully automatically, and then the links of chain are positioned next to each other and connected together by inserting the connecting members 9, which run across between the lengths of chain.

I claim:
1. A protective tire chain whose network consists of contiguous hexagons wherein each side of each hexagon consists of an oval chain link element positioned in a plane at right angles to the tire surface, and each corner is formed by an element positioned in a plane parallel to the tire surface, characterized in that each of the latter elements are oval chain links with their long axes positioned transversely to the direction of travel of the vehicle.

2. A protective tire chain according to claim 1, wherein the greatest internal diameter ($t$) of the oval chain member is a little greater than three times the thickness of the element which is positioned in a plane at right angles to the tire surface.

3. A protective tire chain according to claim 2, wherein the greatest internal diameter ($t$) of the oval chain member is between 3.1 and 3.5$d$, wherein $d$ is the thickness of the element which is positioned in a plane at right angles to the tire tread surface.

4. A protective tire chain according to claim 3, wherein $t = 3.2d$.

5. A protective tire chain according to claim 1, wherein the least internal diameter of the oval chain member is a little greater than the thickness of the element which is positioned in a plane at right angles to the tire tread surface.

References Cited

UNITED STATES PATENTS 3,310,092  3/1967  Rieger _____ 152—171

FOREIGN PATENTS 1,297,025  5/1962  France.

ARTHUR L. LA POINT, *Primary Examiner.*

C. B. LYON, *Assistant Examiner.*

U.S. Cl. X.R.

152—171